(12) United States Patent
Lee et al.

(10) Patent No.: US 10,956,060 B2
(45) Date of Patent: Mar. 23, 2021

(54) MEMORY SYSTEM DYNAMICALLY ALLOCATING MEMORY SPACES AND METHOD OF OPERATING THE SAME

(71) Applicant: SK hynix Inc., Gyeonggi-do (KR)

(72) Inventors: Ji Hoon Lee, Gyeonggi-do (KR); Jeong Ho Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 27 days.

(21) Appl. No.: 15/984,761

(22) Filed: May 21, 2018

(65) Prior Publication Data
US 2019/0121558 A1  Apr. 25, 2019

(30) Foreign Application Priority Data
Oct. 19, 2017  (KR) .................. 10-2017-0135912

(51) Int. Cl.
*G06F 3/06* (2006.01)
*G06F 12/1009* (2016.01)

(52) U.S. Cl.
CPC .......... *G06F 3/0631* (2013.01); *G06F 3/0604* (2013.01); *G06F 3/0605* (2013.01); *G06F 3/0653* (2013.01); *G06F 3/0656* (2013.01); *G06F 3/0679* (2013.01); *G06F 3/0688* (2013.01); *G06F 12/1009* (2013.01); *G06F 2212/657* (2013.01); *G06F 2212/7201* (2013.01)

(58) Field of Classification Search
CPC ........... G06F 12/1009; G06F 2212/657; G06F 2212/7201; G06F 3/0604; G06F 3/0631; G06F 3/0653; G06F 3/0656; G06F 3/0679; G06F 13/1673; G06F 2209/508; G06F 9/5016
See application file for complete search history.

(56) References Cited

U.S. PATENT DOCUMENTS

| | | | |
|---|---|---|---|
| 6,185,641 B1 | 2/2001 | Dunnihoo | |
| 2002/0138692 A1* | 9/2002 | Gerhart | G06F 3/0613 711/112 |
| 2005/0071599 A1* | 3/2005 | Modha | G06F 9/5016 711/170 |
| 2005/0125563 A1* | 6/2005 | Douglas | H04L 47/125 709/250 |
| 2015/0046656 A1* | 2/2015 | Blinick | G06F 12/0848 711/129 |
| 2017/0192686 A1* | 7/2017 | Niu | G06F 3/0608 |
| 2018/0275873 A1* | 9/2018 | Frid | G06F 3/061 |

FOREIGN PATENT DOCUMENTS

KR   100498508   7/2005

* cited by examiner

*Primary Examiner* — Jane Wei
(74) *Attorney, Agent, or Firm* — IP & T Group LLP

(57) ABSTRACT

Provided herein may be a memory system and a method of operating the memory system. The method includes: allocating a first buffer region to a first workload group; allocating a second buffer region to a second workload group; monitoring a first workload group latency and a second workload group latency; and dynamically adjusting a memory space of each of the first and second buffer regions based on a result of the monitoring.

14 Claims, 9 Drawing Sheets

MEMORY SYSTEM DYNAMICALLY ALLOCATING MEMORY SPACES AND METHOD OF OPERATING THE SAME

CROSS-REFERENCE TO RELATED APPLICATION

The present application claims priority under 35 U.S.C. § 119(a) to Korean patent application number 10-2017-0135912, filed on Oct. 19, 2017, which is incorporated herein by reference in its entirety.

BACKGROUND

1. Field of Invention

Various embodiments of the present disclosure relate generally to a memory system, and more particularly, to a memory system configured to monitor the performances of a host interface and a flash interface and dynamically allocate a buffer memory based on the monitoring, and a method of operating the memory system.

2. Description of the Related Art

A typical memory device may include a plurality of memory blocks, each of which may include a plurality of memory cells for storing data. Typically, the memory cells included in each memory block may be simultaneously erased.

Memory systems including a plurality of memory devices are known. In such memory systems, a plurality of memory blocks included in the plurality of memory devices may be divided into a plurality of super blocks each including two or more memory blocks. Management on a super block basis makes it possible for the memory system to more efficiently control the plurality of memory blocks.

Memory systems which include a dynamic random-access memory (DRAM) which has a memory region allocated for workload processing in a host interface, and a memory region allocated for workload processing in a flash interface are also known. In such memory systems, the workload processing performance in the host interface and in the flash interface may depend on the sizes of the respective memory regions allocated thereto.

SUMMARY

Various embodiments of the present disclosure are directed to a memory system and method capable of monitoring the performances of a host interface and a flash interface and dynamically reallocating a buffer memory between the host interface and the flash interface processing based on the performances of the host interface and the flash interface.

An embodiment of the present disclosure provides a method of operating a memory system, including: allocating a first buffer region to a first workload group; allocating a second buffer region to a second workload group; monitoring a first workload group latency and a second workload group latency; and dynamically adjusting a memory space of each of the first and second buffer regions based on a result of the monitoring.

Another embodiment of the present disclosure provides a memory system including: a host interface configured to communicate with a host and to process host workloads received from the host; a flash interface configured to communicate with a nonvolatile memory device and to process flash workloads using the nonvolatile memory device; a performance monitoring management section configured to monitor performances with which the host workloads and the flash workloads are processed; and a buffer memory including a host workload process region allocated to process the host workloads, and a flash workload process region allocated to process the flash workloads. The performance monitoring management section may dynamically allocate memory spaces of the host workload process region and the flash workload process region based on a result of the monitoring of the performances.

Yet another embodiment of the present disclosure provides a method of operating a memory system, including: setting a first bandwidth for first workload processing through a host interface; setting a second bandwidth for second workload processing through a flash interface; monitoring a quality of service (QoS) of the first workload processing through the host interface; and dynamically varying the first bandwidth and the second bandwidth based on a result of the monitoring.

These and other features and advantages of the present invention will become apparent to those with ordinary skill in the art to which the present invention belongs from the following description in conjunction with the accompanying drawings.

DETAILED DESCRIPTION

Figure 1:
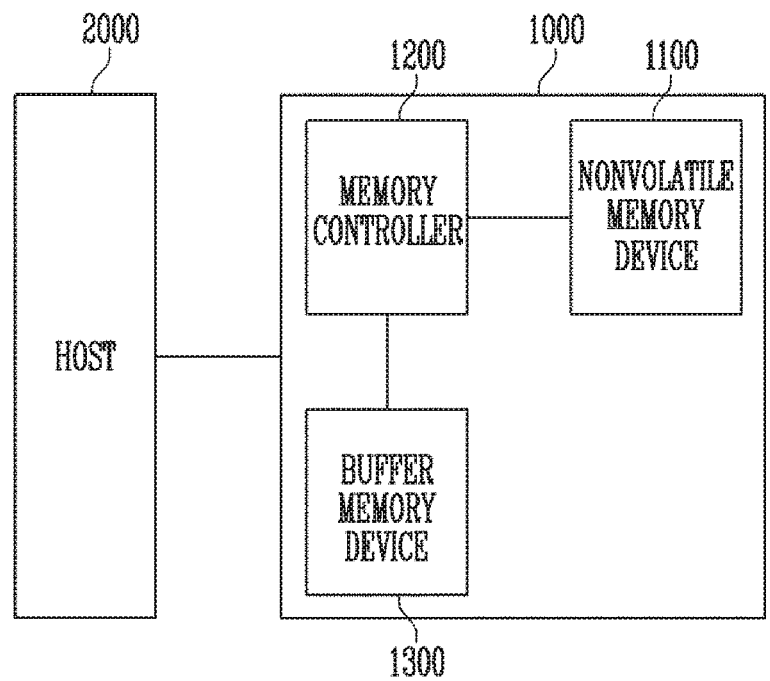
FIG. 1 is a diagram illustrating a memory system operatively coupled to a host, in accordance with an embodiment of the present disclosure.

Example embodiments of the invention will now be described more fully hereinafter with reference to the accompanying drawings; however, it is noted that the invention may be embodied in different other forms and should not be construed as being limited only to the embodiments set forth herein. Rather, these embodiments are provided so that this disclosure will be thorough and complete, and will fully convey the scope of exemplary embodiments to those skilled in the art to which the present invention belongs.

In the drawing figures, dimensions may be exaggerated for clarity of illustration. It will be understood that when an element is referred to as being "between" two elements, it can be the only element between the two elements, or one or more intervening elements may also be present.

Hereinafter, embodiments will be described with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as being limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

FIG. 1 is a diagram illustrating a memory system 1000, in accordance with an embodiment of the present disclosure.

Referring to FIG. 1, the memory system 1000 may include a nonvolatile memory device 1100 which retains stored data even when power is turned off, a buffer memory device 1300 configured to temporarily store data, and a memory controller 1200 configured to control the nonvolatile memory device 1100 and the buffer memory device 1300 under control of a host 2000.

The host interface 2000 may communicate with the memory system 1000 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The memory controller 1200 may control the overall operation of the memory system 1000 and data exchange between the host 2000 and the nonvolatile memory device 1100. For instance, the memory controller 1200 may control the nonvolatile memory device 1100 to program or read data in response to a request of the host 2000. Furthermore, the memory controller 1200 may control the nonvolatile memory device 1100 such that information is stored in main memory blocks and sub-memory blocks included in the nonvolatile memory device 1100, and a program operation is performed on the main memory blocks or the sub-memory blocks depending on the amount of data loaded for the program operation. In an embodiment, the nonvolatile memory device 1100 may include a flash memory.

The memory controller 1200 may control data exchange between the host 2000 and the buffer memory device 1300 or temporarily store system data for controlling the nonvolatile memory device 1100 in the buffer memory device 1300.

The buffer memory device 1300 may be used as an operation memory, a cache memory, or a buffer memory of the memory controller 1200. The buffer memory device 1300 may store codes and commands to be executed by the memory controller 1200. The buffer memory device 1300 may store data to be processed by the memory controller 1200.

The memory controller 1200 may temporarily store data input from the host 2000 in the buffer memory device 1300, and then transmit the data temporarily stored in the buffer memory device 1300 to the nonvolatile memory device 1100 and store it therein. Furthermore, the memory controller 1200 may receive data and a logical address from the host 2000 and convert the logical address to a physical address indicating an area in which the data is to be actually stored in the nonvolatile memory device 1100. The memory controller 1200 may store, in the buffer memory device 1300, a logical-to-physical address mapping table indicating mapping relationship between logical addresses and physical addresses.

In an embodiment, the buffer memory device 1300 may include a double data rate synchronous dynamic random-access memory (DDR SDRAM), a DDR4 SDRAM, a low power double data rate4 (LPDDR4) SDRAM, a graphics double data rate (GDDR) SDRAM, a low power DDR (LPDDR), or a rambus dynamic random-access memory (RDRAM).

Figure 2:
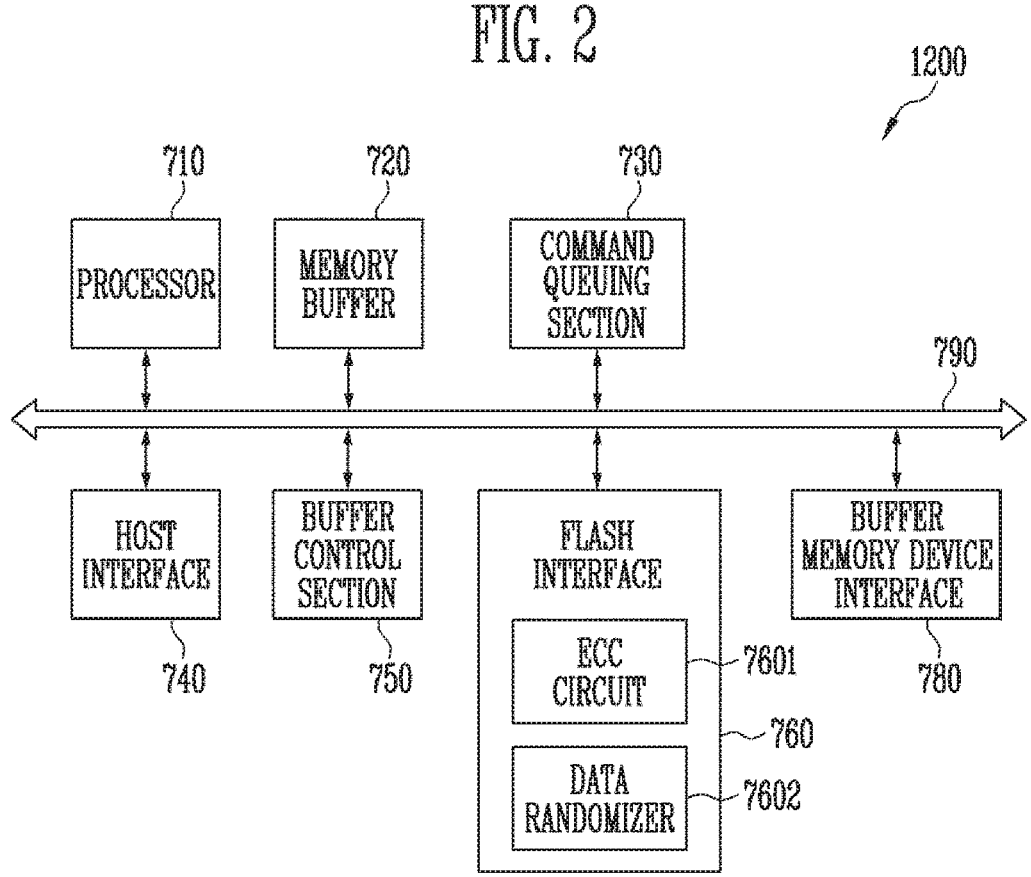
FIG. 2 is a diagram illustrating an exemplary configuration of a memory controller employed by the memory system shown in FIG. 1.

FIG. 2 is a diagram illustrating the memory controller 1200 shown in FIG. 1.

Referring to FIG. 2, the memory controller 1200 may include a processor 710, a memory buffer 720, a command queuing section 730, a host Interface 740, a buffer control section 750, a flash interface 760, a buffer memory device interface 780, and a bus 790. The flash interface 760 may include an error correction code (ECC) circuit 7601, and a data randomizer 7602.

The bus 790 may provide a channel between components of the memory controller 1200.

The processor 710 may control the overall operation of the memory controller 1200 and perform a logical operation. The processor 710 may communicate with the external host 2000 through the host interface 740, and communicate with the nonvolatile memory device 1100 through the flash interface 760. Furthermore, the processor 710 may communicate with the buffer memory device 1300 through the buffer memory device interface 780. The processor 710 may control the memory buffer 720 through the buffer control section 750. The processor 710 may use the memory buffer 720 as an operation memory, a cache memory, or a buffer memory to control the operation of the memory system 1000.

The command queuing section 730 may queue a plurality of commands input from the host 2000. This operation is called a multi-queuing operation. The command queuing section 730 may sequentially transmit the queued commands to the nonvolatile memory device 1100. The command queuing section 730 may include an embedded SRAM. For example, the command queuing section 730 may be included in the processor 710. Alternatively, the command queuing section 730 may be included in the flash interface 760.

The memory buffer 720 may be used as an operation memory, a cache memory, or a buffer memory of the processor 710. The memory buffer 720 may store codes and commands to be executed by the processor 710. The memory buffer 720 may store data to be processed by the processor 710. The memory buffer 720 may include an embedded static RAM (embedded SRAM) or an embedded dynamic RAM (embedded DRAM).

The host interface 740 may communicate with the external host 2000 under control of the processor 710. The host interface 740 may perform communication using at least one of various communication methods such as a universal serial bus (USB), a serial AT attachment (SATA), a serial attached SCSI (SAS), a high speed intership (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer control section 750 may control the memory buffer 720 under control of the processor 710.

The flash interface 760 may communicate with the nonvolatile memory device 1100 under control of the processor 710. The flash interface 760 may communicate a command, an address, and data with the nonvolatile memory device 1100 through a channel.

For example, the memory controller 1200 may include neither the memory buffer 720 nor the buffer control section 750.

For example, the processor 710 may use codes to control the operation of the memory controller 1200. The processor 710 may load codes from a nonvolatile memory device (e.g., a read only memory) provided in the memory controller 1200. Alternatively, the processor 710 may load codes from the nonvolatile memory device 1100 through the flash interface 760.

The flash interface 76 may include the ECC circuit 7601. The ECC circuit 7601 may perform error correction. The ECC circuit 7601 may perform ECC encoding based on data to be written in the nonvolatile memory device 1100 through the flash interface 760. ECC encoded data may be transmitted to the nonvolatile memory device 1100 through the flash interface 760. The ECC circuit 7601 may perform ECC decoding for data received from the nonvolatile memory device 1100 through the flash interface 760.

The flash interface 76 may include the data randomizer 7602. The data randomizer 7602 may randomize data or de-randomize the randomized data. The data randomizer 7602 may perform a data randomization operation for data to be written in the nonvolatile memory device 1100 through the flash interface 760. The randomized data may be transmitted to the nonvolatile memory device 1100 through the flash interface 760. The data randomizer 7602 may perform a data de-randomization operation for data received from the nonvolatile memory device 1100 through the flash interface 760.

For example, the bus 790 of the memory controller 1200 may be divided into a control bus and a data bus. The data bus may transmit data in the memory controller 1200. The control bus may transmit control information such as a command and an address in the memory controller 1200. The data bus and the control bus may be separated from each other and may neither interfere with each other nor affect each other. The data bus may be coupled to the host interface 740, the buffer control section 750, the flash interface 760, and the buffer memory device interface 780. The control bus may be coupled to the host interface 740, the processor 710, the buffer control section 750, the flash interface 760, and the buffer memory device interface 780.

The buffer memory device interface 780 may communicate with the buffer memory device 1300 under control of the processor 710. The buffer memory device interface 780 may communicate a command, an address, and data with the buffer memory device 1300 through a channel.

Figure 3:
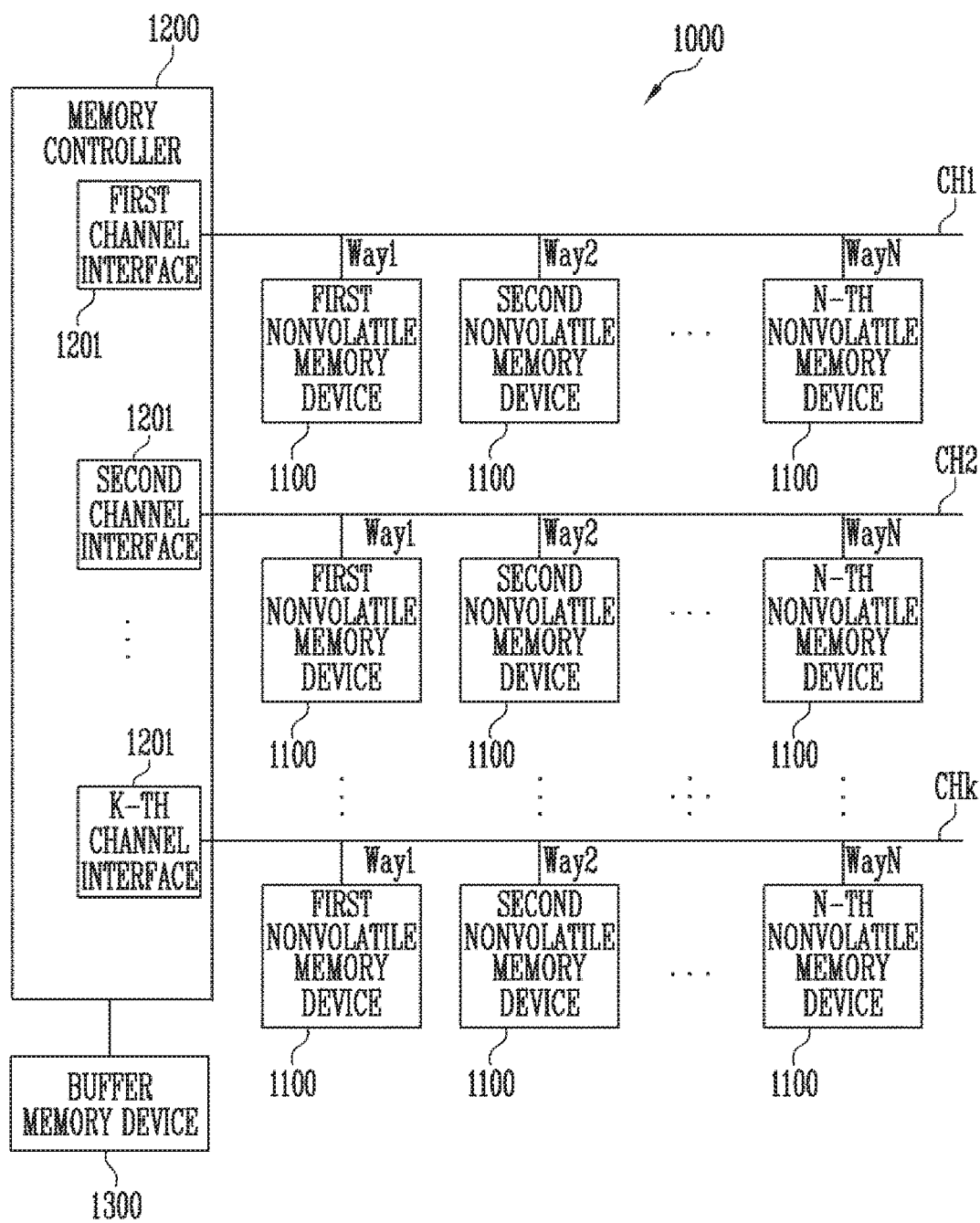
FIG. 3 is a diagram illustrating a memory system including a plurality of non-volatile memory devices, in accordance with another embodiment of the present disclosure.

FIG. 3 is a diagram illustrating a memory system 1000 in accordance with an embodiment of the present disclosure. FIG. 3 illustrates the memory system 1000 including a memory controller 1200, and a plurality of nonvolatile memory devices 1100 coupled to the memory controller 1200 through a plurality of channels CH1 to CHk.

Referring to FIG. 3, the memory controller 1200 may communicate with the nonvolatile memory devices 1100 through the channels CH1 to CHk. The memory controller 1200 may include a plurality of channel interfaces 1201. Each of the channels CH1 to CHk may be coupled to a corresponding one of the channel interfaces 1201. For example, the first channel CH1 may be coupled the first channel interface 1201, the second channel CH2 may be coupled to the second channel interface 121, and the k-th channel CHk may be coupled to the k-th channel interface 1201. Each of the channels CH1 to CHk may be coupled to one or more nonvolatile memory devices 1100. The nonvolatile memory devices 1100 that are coupled to different channels may operate independently from each other. For example, the nonvolatile memory devices 1100 coupled to the first channel CH1 may operate independently from the nonvolatile memory devices 1100 coupled to the second channel CH2. For instance, the memory controller 1200 may communicate data or a command through the first channel CH1 with the nonvolatile memory devices 1100 coupled to the first channel CH1 and, in parallel, communicate data or a command through the second channel CH2 with the nonvolatile memory devices 1100 coupled to the second channel CH2.

Each of the channels CH1 to CHk may be coupled to a plurality of nonvolatile memory devices 1100. The nonvolatile memory devices 1100 coupled to each channel may form respective different ways. For example, N nonvolatile memory devices 1100 may be coupled to each channel, and each nonvolatile memory device 1100 may form a different way. For example, first to N-th nonvolatile memory devices 1100 may be coupled to the first channel CH1. The first nonvolatile memory device 1100 may form a first way Way1, the second nonvolatile memory device 1100 may form a second way Way2, and the N-th nonvolatile memory device 1100 may form an N-th way WayN. Alternatively, unlike the example of FIG. 2, two or more nonvolatile memory devices 1100 may form a single way.

The first to Nth nonvolatile memory devices 1100 coupled to the first channel CH1 may successively communicate data or a command with the memory controller 1200, rather than simultaneously communicating in parallel the data or the command with the memory controller 1200, because the first to N-th nonvolatile memory devices 1100 share the first channel CH1. In other words, while the memory controller 1200 sends, through the first channel CH1, data to the first nonvolatile memory device 1100 forming the first way Way1 of the first channel CH1, each of the second to N-th nonvolatile memory devices 1100 forming the second to N-th ways Way2 to WayN of the first channel CH1 cannot communicate data or a command with the memory controller 1200 through the first channel CH1. In other words, while any one of the first to N-th nonvolatile memory devices 1100 sharing the first channel CH1 possesses the first channel CH1, the other nonvolatile memory devices 1100 coupled to the first channel CH1 cannot use the first channel CH1.

The first nonvolatile memory device 1100 forming the first way Way1 of the first channel CH1 and the first nonvolatile memory device 1100 forming the first way Way1 of the second channel CH2 may independently communicate with the memory controller 1200. In other words, while the memory controller 1200 communicates data with the first nonvolatile memory device 1100 forming the first way Way1 of the first channel CH1 through the first channel CH1 and the first channel interface 1201, simultaneously the memory controller 1200 may communicate data with the first nonvolatile memory device 1100 forming the first way Way1 of the second channel CH2 through the second channel CH2 and the second channel interface 1201.

Figure 4:
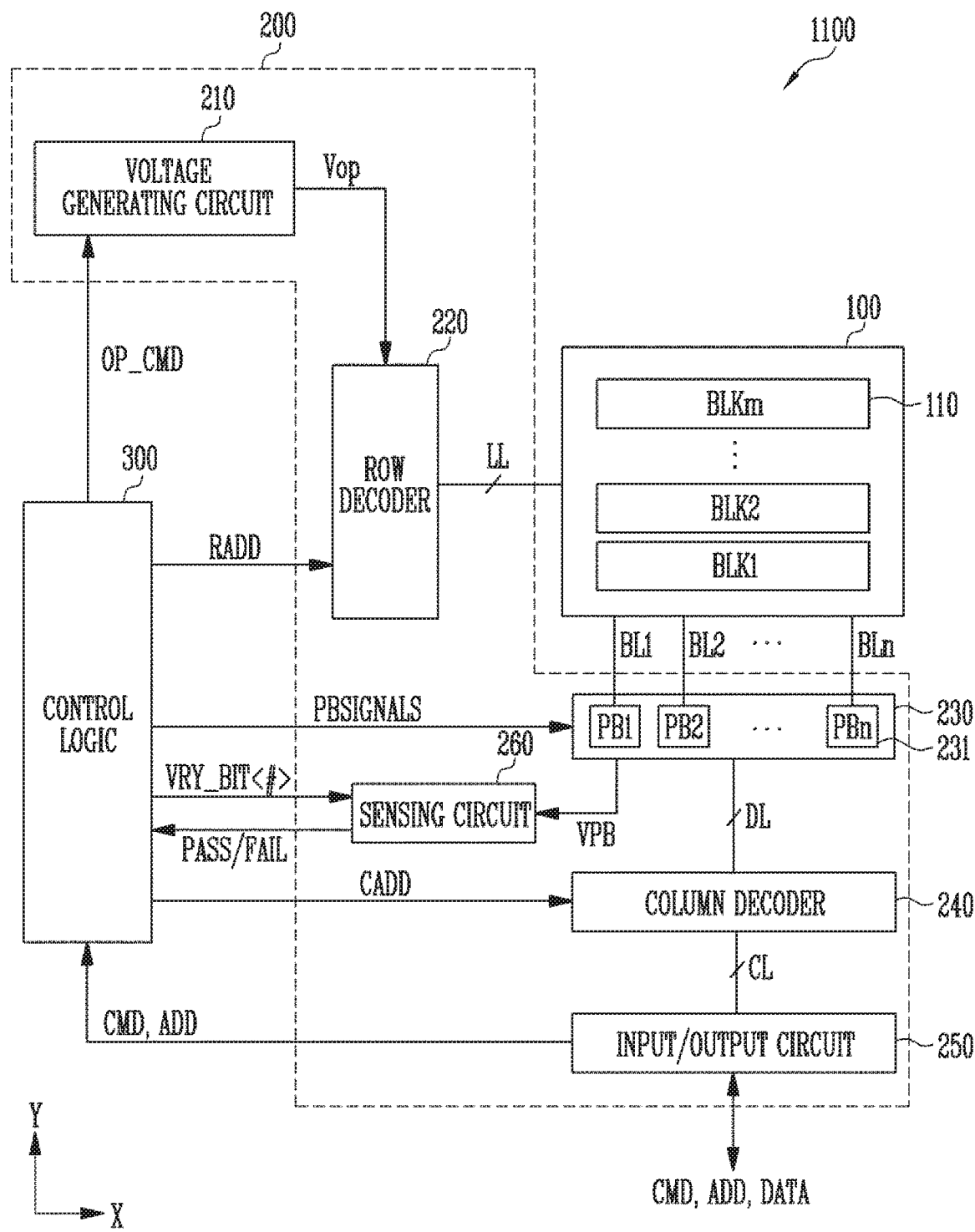
FIG. 4 is a diagram illustrating an exemplary configuration of a nonvolatile memory device shown in FIG. 1.

FIG. 4 is a diagram illustrating the nonvolatile memory device 1100 shown in FIG. 1.

Referring to FIG. 4, the nonvolatile memory device 1100 may include a memory cell array 100 configured to store data. The nonvolatile memory device 1100 may include peripheral circuits 200 configured to perform a program operation for storing data in the memory cell array 100, a read operation for outputting the stored data, and an erase operation for erasing the stored data. The nonvolatile memory device 1100 may include a control logic 300 configured to control the peripheral circuits 200 under control of the memory controller (1200 of FIG. 1).

The memory cell array 100 may include a plurality of memory blocks BLK1 to BLKm (110; m is a positive integer). Local lines LL and bit lines BL1 to BLn (n is a positive integer) may be coupled to each of the memory blocks BLK1 to BLKm (110). For example, the local lines LL may include a first select line, a second select line, and a plurality of word lines arranged between the first and second select lines. Furthermore, the local lines LL may include dummy lines arranged between the first select line and the word lines and between the second select line and the word lines. Here, the first select line may be a source select line, and the second select line may be a drain select line. For example, the local lines LL may include word lines, drain select lines, source select lines, and source lines. The local lines LL may further include dummy lines. In addition, the local lines LL may further include pipelines. The local lines LL may be coupled to each of the memory blocks BLK1 to BLKm (110). The bit lines BL1 to BLn may be coupled in common to the memory blocks BLK1 to BLKm (110). The memory blocks BLK1 to BLKm (110) may be embodied in a two- or three-dimensional structure. For example, in the memory blocks 110 having a two-dimensional structure, the memory cells may be arranged in a direction parallel to a substrate. For example, in the memory blocks 110 having a three-dimensional structure, the memory cells may be stacked in a direction perpendicular to the substrate.

The peripheral circuits 200 may perform program, read and erase operations on a selected memory block 110 under control of the control logic 300. For example, under control of the control logic 300, the peripheral circuits 200 may supply a verify voltage and pass voltages to the first select line, the second select line, and the word lines, selectively discharge the first select line, the second select line, and the word lines, and verify memory cells coupled to a selected word line among the word lines. For instance, the peripheral circuits 200 may include a voltage generating circuit 210, a row decoder 220, a page buffer group 230, a column decoder 240, an input/output circuit 250, and a sensing circuit 260.

The voltage generation circuit 210 may generate various operating voltages Vop to be used for the program, read, and erase operations in response to an operating signal OP_CMD. Furthermore, the voltage generating circuit 210 may selectively discharge the local lines LL in response to an operating signal OP_CMD. For example, the voltage generating circuit 210 may generate a program voltage, a verify voltage, pass voltages, a turn-on voltage, a read voltage, an erase voltage, a source line voltage, etc. under control of the control logic 300.

The row decoder 220 may transmit operating voltages Vop to local lines WL coupled to a selected memory block 110 in response to a row address RADD.

The page buffer group 230 may include a plurality of page buffers PB1 to PBn (231) coupled to the bit lines BL1 to BLn. The page buffers PB1 to PBn (231) may operate in response to page buffer control signals PBSIGNALS. For instance, the page buffers PB1 to PBn (231) may temporarily store data received through the bit lines BL1 to BLn or sense voltages or currents of the bit lines BL1 to BLn during a read or verify operation.

The column decoder 240 may transmit data between the input/output circuit 250 and the page buffer group 230 in response to a column address CADD. For example, the column decoder 240 may exchange data with the page buffers 231 through data lines DL or exchange data with the input/output circuit 250 through column lines CL.

The input/output circuit 250 may transmit a command CMD or an address ADD received from the memory controller (1200 of FIG. 1) to the control logic 300, or exchange data with the column decoder 240.

During the read or verify operation, the sensing circuit 260 may generate a reference current in response to an enable bit VRY_BIT<#>, and may compare a sensing voltage VPB received from the page buffer group 230 with a reference voltage generated by the reference current and output a pass signal PASS or a fail signal FAIL.

The control logic 300 may output an operating signal OP_CMD, a row address RADD, page buffer control signals PBSIGNALS, and an enable bit VRY_BIT<#> in response to a command CMD and an address ADD and thus control the peripheral circuits 200. In addition, the control logic 300 may determine whether target memory cells have passed or failed a verify operation in response to a pass or fail signal PASS or FAIL.

In the operation of the nonvolatile memory device 1100, each memory block 110 may be the basic unit of an erase operation. In other words, a plurality of memory cells included in each memory block 110 may be simultaneously erased rather than being selectively erased.

Figure 5:
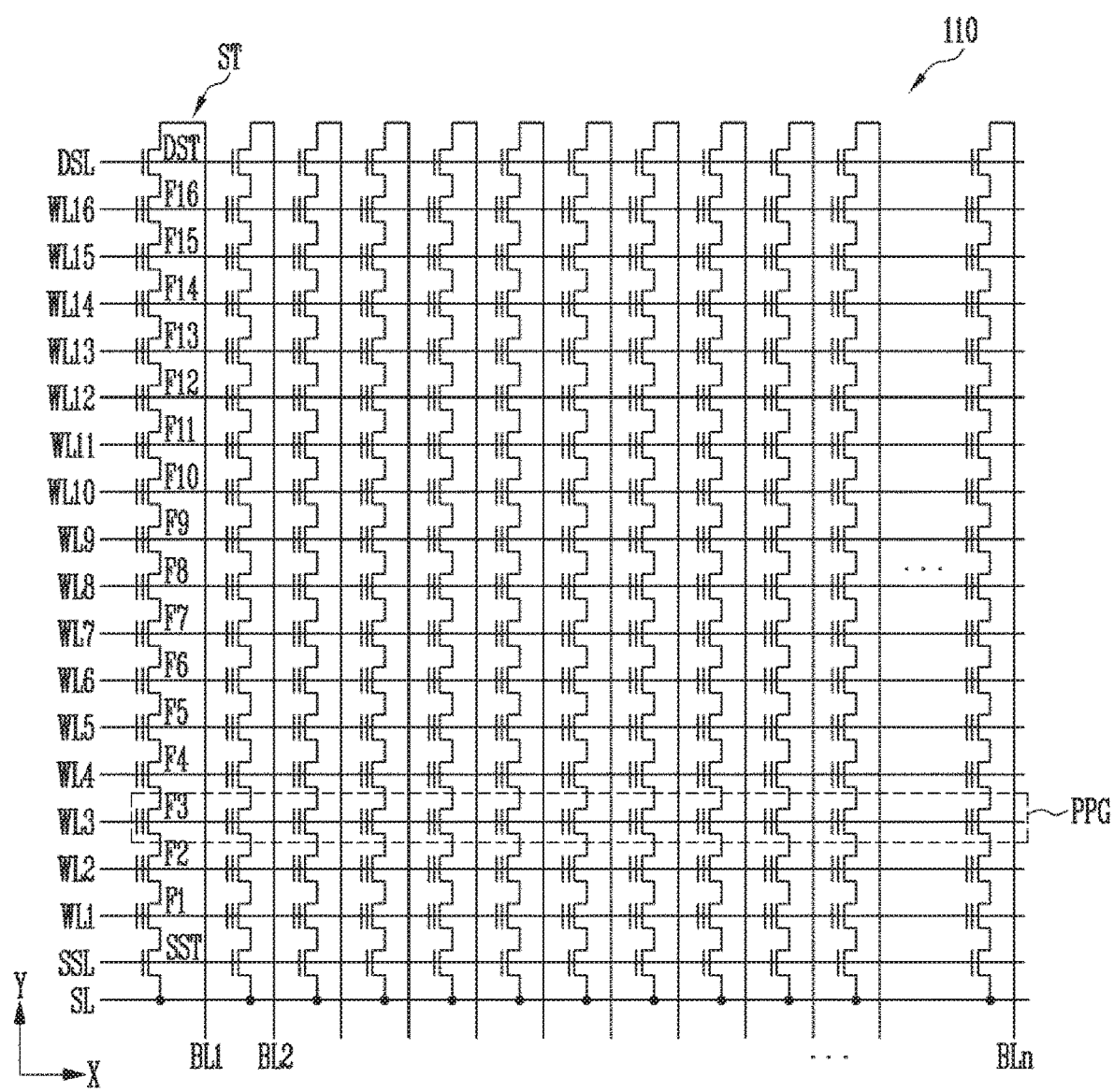
FIG. 5 is a diagram illustrating an exemplary configuration of a memory block employed in the nonvolatile memory device shown in FIG. 4.

FIG. 5 is a diagram illustrating a memory block 110 shown in FIG. 4.

Referring to FIG. 5, in the memory block 110, a plurality of word lines arranged parallel to each other may be coupled between a first select line and a second select line. Here, the first select line may be a source select line SSL, and the second select line may be a drain select line DSL. In more detail, the memory block 110 may include a plurality of strings ST coupled between the bit lines BL1 to BLn and the source line SL. The bit lines BL1 to BLn may be respectively coupled to the strings ST, and the source lines SL may be coupled in common to the strings ST. The strings ST may have the same configuration; therefore, the string ST that is coupled to the first bit line BL1 will be described in detail by way of example.

The string ST may include a source select transistor SST, a plurality of memory cells F1 to F16, and a drain select transistor DST which are coupled in series to each other between the source line SL and the first bit line BL1. At least one source select transistor SST and at least one drain select transistor DST may be included in each string ST, and a larger number of memory cells than the number of memory cells F1 to F16 shown in the drawing may be included in each string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells F1 to F16 may be coupled to the plurality of word lines WL1 to WL16. Among the memory cells included in different strings ST, a group of memory cells coupled to each word line may be referred to as a physical page PPG. Therefore, the number of physical pages PPG included in the memory block 110 may correspond to the number of word lines WL1 to WL16.

Each memory cell may store 1-bit data. This memory cell is typically called a single level cell SLC. In this case, each physical page PPG may store data of a single logical page LPG. Data of each logical page LPG may include data bits corresponding to the number of cells included in a single physical page PPG. Each memory cell may store 2- or more-bit data. This memory cell is typically called a multi-level cell MLC. In this case, each physical page PPG may store data of two or more logical pages LPG.

A plurality of memory cells included in each physical page PPG may be simultaneously programmed. In other words, the nonvolatile memory device 1100 may perform a program operation on a physical page (PPG) basis. A plurality of memory cells included in each memory block may be simultaneously erased. In other words, the nonvolatile memory device 1100 may perform an erase operation on a memory block basis. For example, to update some data stored in one memory block 110, the entire data stored in the memory block 110 may be read, data needed to be updated among the entire data may be changed, and then the entire data may be reprogrammed to another memory block 110. The reason for this is because of the fact that, in the case where each memory block 110 is the basic unit of the erase operation of the operation of the nonvolatile memory device 1100, it is impossible to erase only some of the data stored in the memory block 110 and program new data thereto again. Such characteristics of the memory device may be one of the factors making a garbage collection operation complex. Furthermore, when an error occurs in some memory cells included in a memory block 110 due to deterioration in use of the memory cells, the associated memory block 110 may be regarded as a bad block, and all of the memory cells included in the bad block may not be used.

Figure 6:
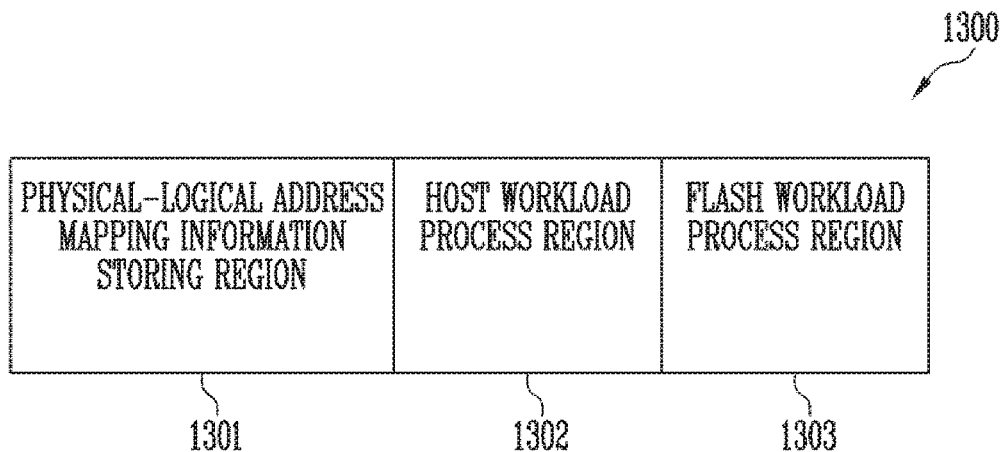
FIG. 6 is a diagram illustrating a buffer memory device, in accordance with an embodiment of the present disclosure.

FIG. 6 is a diagram illustrating an exemplary configuration for buffer memory device 1300, in accordance with an embodiment of the present disclosure.

Referring to FIG. 6, the buffer memory device 1300 may include a physical-logical address mapping information storing region 1301, a host workload process region 1302, and a flash workload process region 1303.

For example, when a read command and a logical address corresponding to the read command are entered from the host 2000 to the memory system 1000, the processor 710 of the memory controller 1200 may read a physical address corresponding to the logical address from the physical-logical address mapping information storing region 1301. The flash interface 760 of the memory controller 1200 may perform an operation of reading data corresponding to the read command from the nonvolatile memory device 1100 based on the physical address read out from the physical-logical address mapping information storing region 1301, and temporarily store the read data in the flash workload process region 1303 of the buffer memory device 1300.

One or more commands entered from the host 2000 and performed by the nonvolatile memory device 1100 may be queued in the command queuing section 730 of FIG. 2. The memory system 1000 may receive a plurality of commands from the host 2000 queue them in the command queuing section 730, and vary a processing sequence of the queued commands.

The flash interface 760 may read out read data from the nonvolatile memory device 1100 based on the read command and the physical address corresponding to the logical address, and may temporarily store the read data in the flash workload process region 1303 of the buffer memory device 1300. Here, if a memory capacity of the flash workload process region 1303 is insufficient, the processor 710 may delay the entering the read command in the nonvolatile memory device 1100. In other words, the processor 710 may delay a read command processing operation until the memory space of the flash workload process region 1303 for the read command processing is secured. That is, when the memory space of the flash workload process region 1303 is insufficient, the latency of the read command processing is increased. The read data which are temporarily stored in the flash workload process region 1303 of the buffer memory device 1300 may be transferred to the host 2000, and thereafter erased from the flash workload process region 1303. The erased space becomes thus available and may be used for other purposes. In other words, after the read data has been transferred to the host 2000, the read data can be erased from the flash workload process region 1303. The memory space from which the read data has been erased is then allocated for a new workload.

Hence, for example, if the memory capacity of the flash workload process region 1303 is relatively small, a memory space for workloads to be processed in the nonvolatile memory devices 1100, e.g., the memory space for temporarily storing data read out from the nonvolatile memory device 1100 when read commands are processed, may be insufficient. As a result, the latency of workload processing by the nonvolatile memory devices 1100 may be increased.

Also, as an example, when a program command, program data, and a logical address corresponding to the program command are entered from the host 2000 through the host interface 740, the host interface 740 may transmit the logical address to the processor 710 of the memory controller 1200, and the processor 710 may allocate a memory block 110 for storing the program data in the nonvolatile memory device 1100, and may store the physical-logical address mapping information between the logical address entered from the host interface 740 and the allocated memory block 110 in the physical-logical address mapping information storing region 1301. Subsequently, the processor 710 of the memory controller 1200 may perform an operation of programming the program data to the allocated memory block 110 of the nonvolatile memory device 1100 based on the physical address.

Here, the host interface 740 may temporarily store the program data input from the host 2000 in the host workload process region 1302 of the buffer memory device 1300. Thereafter, the program data which are temporarily stored in the host workload process region 1302 of the buffer memory device 1300 may be programmed to the nonvolatile memory device 1100, and thereafter erased from the host workload process region 1302. The erased space gets thus freed and may be used for other purposes. In other words, after the program data has been programmed to the nonvolatile memory device 1100, the program data can be erased from the host workload process region 1302. The memory space from which the program data has been erased may then be allocated for new workload. Here, if a memory capacity of the host workload process region 1302 is relatively small, a memory space for workloads to be processed through the host interface 740, e.g., a memory space for receiving program commands and temporarily storing program data, may be insufficient. Consequently, the latency of workload processing through the host interface 740 is increased.

In an embodiment, the physical-logical address mapping information storing region 1301, the host workload process region 1302, and the flash workload process region 1303 may be included in the memory buffer 720 of FIG. 2. As described above, the memory buffer 720 may include an embedded SRAM. The buffer memory device 1300 and the memory buffer 720 may be collectively called a buffer memory.

Figure 7:
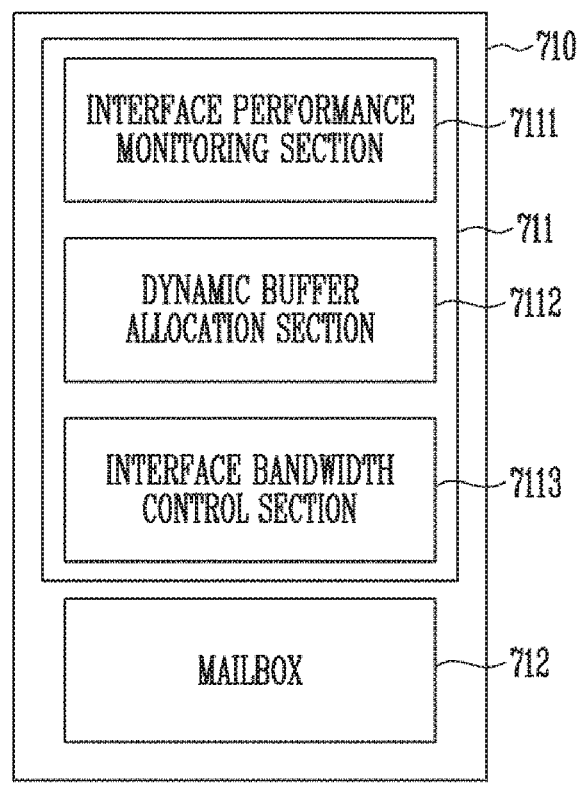
FIG. 7 is a diagram illustrating a processor in accordance with an embodiment of the present disclosure.

FIG. 7 is a diagram illustrating an exemplary configuration of the processor 710, in accordance with an embodiment of the present disclosure.

Referring to FIG. 7, the processor 710 of the memory controller 1200 may include a performance monitoring management section 711, and a mailbox 712. The performance monitoring management section 711 may include an interface performance monitoring section 7111, a dynamic buffer allocation section 7112, and an interface bandwidth control section 7113.

The interface performance monitoring section 7111 may monitor the performance with which the host interface 740 processes host workloads received from the host 2000. The host workloads may be collectively called a host workload group. The performance with which the host workloads are processed by the host interface 740 may be deduced by monitoring the latency required to process the host workloads. In other words, the interface performance monitoring section 7111 may monitor the latency required for the host interface 740 to process the host workloads received from the host.

The interface performance monitoring section 7111 may monitor the quality of service (QoS) for workloads requested from the host 2000. The QoS for workloads request from the host 2000 may refer to an average of the latencies generated for the respective workloads. In an embodiment, the QoS for the workloads requested from the host 2000 may markedly deteriorate due to some largely deviated latencies among the latencies generated for the respective workloads.

For improving the QoS for the workloads requested from the host 2000, the memory system 1000 predicts the latencies to be generated for the respective workloads and manages them to prevent them from becoming largely deviated from a predictable level.

The interface performance monitoring section 7111 may monitor the performance with which the flash interface 760 processes flash workloads corresponding to commands queued in the command queuing section 730 through the nonvolatile memory device 1100. The flash workloads may be processed through the nonvolatile memory device 1100 by the flash interface 760. The flash workloads may be collectively called a flash workload group. The performance with which the flash workloads are processed by the flash interface 760 may be deduced by monitoring the latency required to process the flash workloads. In other words, the interface performance monitoring section 7111 may monitor the latency required for the flash interface 760 to process the flash workloads through the nonvolatile memory device 1100. After the flash workloads corresponding to the commands queued in the command queuing section 730 have been completely processed through the nonvolatile memory device 1100, the corresponding commands may be erased from the command queuing section 730. In other words, the interface performance monitoring section 7111 may deduce the performance of the flash interface 760 by monitoring the flash workloads corresponding to the commands that are queued in or erased from the command queuing section 730.

The interface performance monitoring section 7111 may monitor the latency of the host workload group to be processed through the host interface 740 and the latency of the flash workload group to be processed through the flash interface 760, and calculate a ratio of the two latencies. The latency of the host workload group may be an average of latencies of a plurality of host workloads forming the host work group. The latency of the flash workload group may be an average of latencies of a plurality of flash workloads forming the flash work group. The ratio may be obtained by dividing the latency of the host workload group by the latency of the flash workload group. For example, if the ratio is 1.2, the latency of the host workload group is 1.2 times greater than the latency of the flash workload group. In this case, as described with reference to FIG. 6, the memory system 1000 may expand the host workload process region 1302 of the buffer memory device 1300 and also reduce accordingly the flash workload process region 1303, thus reducing the latency of the host workload group while increasing the latency of the flash workload group.

The dynamic buffer allocation section 7112 may allocate an initial value to each of the host workload process region 1302 and the flash workload process region 1303 of the buffer memory device 1300. The dynamic buffer allocation section 7112 may dynamically allocate the host workload process region 1302 and the flash workload process region 1303 of the buffer memory device 1300 based both on the latency of the host workload group that is monitored by the interface performance monitoring section 7111 and is processed through the host interface 740, and on the latency of the flash workload group that is monitored by the interface performance monitoring section 7111 and is processed through the flash interface 760. In other words, the dynamic buffer allocation section 7112 may dynamically allocate the host workload process region 1302 and the flash workload process region 1303 of the buffer memory device 1300 based both on the performance with which the host interface 740 processes the host workload group, and which is monitored by the interface performance monitoring section 7111, and on the performance with which the flash interface 760 processes the flash workload group, and which is monitored by the interface performance monitoring section 7111. The performance with which the host interface 740 processes the host workload group may be an average of the performances with which the host interface 740 processes the respective host workloads included in the host workload group. Likewise, the performance with which the flash interface 760 processes the flash workload group may be an average of the performances with which the flash interface 760 processes respective flash workloads included in the flash workload group.

For example, when the latency of the host workload group processed through the host interface 740 is greater than the latency of the flash workload group to be processed through the flash interface 760 by an amount of a first reference value or more, the dynamic buffer allocation section 7112 may dynamically allocate more memory space to the host workload process region 1302 and less memory space to the flash workload process region 1303 of the buffer memory device 1300. In contrast, when the latency of the flash workload group processed through the flash interface 760 is greater than the latency of the host workload group to be processed through the host interface 740 by an amount of a second reference value or more, the dynamic buffer allocation section 7112 may dynamically allocate less memory space to the host workload process region 1302 and more memory space to the flash workload process region 1303 of the buffer memory device 1300.

Furthermore, when the performance with which the host interface 740 processes the host workload group is greater than the performance with which the flash interface 760 processes the flash workload group by an amount of a first reference value or more, the dynamic buffer allocation section 7112 may dynamically allocate less memory space to the host workload process region 1302 and more memory space to the flash workload process region 1303 of the buffer memory device 1300. In contrast, when the performance with which the flash interface 760 processes the flash workload group is greater than the performance with which the host interface 740 processes the host workload group by an amount of a second reference value or more, the dynamic buffer allocation section 7112 may dynamically allocate more memory space to the host workload process region 1302 and less memory space to the flash workload process region 1303 of the buffer memory device 1300.

Furthermore, when a value obtained by dividing the latency of the host workload group processed through the host interface 740 by the latency of the flash workload group processed through the flash interface 760, i.e., a ratio of the latency of the host workload group and the latency of the flash workload group, is equal to or greater than a first reference value, the dynamic buffer allocation section 7112 may dynamically allocate more memory space to the host workload process region 1302 and less memory space to the flash workload process region 1303 of the buffer memory device 1300. In contrast, when a value obtained by dividing the latency of the host workload group processed through the host interface 740 by the latency of the flash workload group processed through the flash interface 760, i.e., a ratio of the latency of the host workload group and the latency of the flash workload group, is equal to or smaller than a second reference value, the dynamic buffer allocation section 7112 may dynamically allocate less memory space to the host workload process region 1302 and more memory space to the flash workload process region 1303 of the buffer memory device 1300. The first reference value and the second reference value may be selected to be different from each other. The first reference value and the second reference value may be selected to be the same, in which case when a ratio of the latency of the host workload group and the latency of the flash workload group is smaller than the reference value, the dynamic buffer allocation section 7112 may dynamically allocate less memory space to the host workload process region 1302 and more memory space to the flash workload process region 1303 of the buffer memory device 1300, and when a ratio of the latency of the host workload group and the latency of the flash workload group is equal to or greater than the reference value, the dynamic buffer allocation section 7112 may dynamically allocate memory space to the host workload process region 1302 and less memory space to the flash workload process region 1303 of the buffer memory device 1300.

The dynamic buffer allocation section 7112 may dynamically allocate the host workload process region 1302 and the flash workload process region 1303 of the buffer memory device 1300, based on the QoS for workloads requested from the host 2000 and monitored by the interface performance monitoring section 7111. For example, when the QoS monitored by the interface performance monitoring section 7111 is a reference value or less, the dynamic buffer allocation section 7112 may dynamically allocate less memory space to the host workload process region 1302 and more memory space to the flash workload process region 1303 of the buffer memory device 1300.

The dynamic buffer allocation section 7112 may allocate the host workload process region 1302 and the flash workload process region 1303 of the buffer memory device 1300, based on the performance with which is the flash interface 760 processes flash workloads corresponding to commands queued in the command queuing section 730 through the nonvolatile memory device 1100, and which is monitored by the interface performance monitoring section 7111. For example, when the performance with which the flash workloads corresponding to the commands queued in the command queuing section 730 are processed, and which is monitored by the interface performance monitoring section 7111, is equal to a reference value or less, the dynamic buffer allocation section 7112 may dynamically allocate less memory space to the host workload process region 1302 and more memory space to the flash workload process region 1303 of the buffer memory device 1300.

The sum of the host workload process region 1302 and the flash workload process region 1303 of the buffer memory device 1300 may be constant. In other words, the dynamic buffer allocation section 7112 may dynamically divide the buffer memory space having the constant size and allocate the divided memory space to the host workload process region 1302 and the flash workload process region 1303, based on the performances of the host interface 740 and the flash interface 760 that are monitored by the interface performance monitoring section 7111. That is, if the host workload process region 1302 is expanded, the flash workload process region 1303 may be reduced. In contrast, if the host workload process region 1302 is reduced, the flash workload process region 1303 may be expanded.

The interface bandwidth control section 7113 may initialize a bandwidth of host workload group processing by the host interface 740 and a bandwidth of flash workload group processing by the flash interface 760. The interface bandwidth control section 7113 may vary an operation bandwidth of the host interface 740 for processing the host workload group and an operation bandwidth of the flash interface 760 for processing the flash workload group, based both on the latency of the host workload group that is monitored by the interface performance monitoring section 7111 and is processed through the host interface 740, and on the latency of the flash workload group that is monitored by the interface performance monitoring section 7111 and is processed through the flash interface 760. In other words, the interface bandwidth control section 7113 may vary the operation bandwidth of the host interface 740 for processing the host workload group and the operation bandwidth of the flash interface 760 for processing the flash workload group, based both on the performance with which the host interface 740 processes the host workload group, and which is monitored by the interface performance monitoring section 7111, and on the performance with which the flash interface 760 processes the flash workload group, and which is monitored by the interface performance monitoring section 7111.

For example, when the latency of the host workload group processed through the host interface 740 is greater than the latency of the flash workload group to be processed through the flash interface 760 by an amount of a reference value or more, the interface bandwidth control section 7113 may increase the operation bandwidth of the host interface 740 for processing the host workload group and reduce the operation bandwidth of the flash interface 760 for processing the flash workload group. In contrast, when the latency of the flash workload group to be processed through the flash interface 760 is greater than the latency of the host workload group to be processed through the host interface 740 by an amount equal to a reference value or more, the interface bandwidth control section 7113 may reduce the operation bandwidth of the host interface 740 and increase the operation bandwidth of the flash interface 760.

Furthermore, when the performance with the host interface 740 processes the host workload group is greater than the performance with which the flash interface 760 processes the flash workload group by an amount of a reference value or more, the interface bandwidth control section 7113 may reduce the operation bandwidth of the host interface 740 and increase the operation bandwidth of the flash interface 760. In contrast, when the performance with the flash interface 760 processes the flash workload group is greater than the performance with which the host interface 740 processes the host workload group by an amount of a reference value or more, the interface bandwidth control section 7113 may increase the operation bandwidth of the host interface 740 and reduce the operation bandwidth of the flash interface 760.

Furthermore, when a value obtained by dividing the latency of the host workload group to be processed through the host interface 740 by the latency of the flash workload group to be processed through the flash interface 760, i.e., a ratio of the latency of the host workload group and the latency of the flash workload group, is equal to or greater than a first reference value, the interface bandwidth control section 7113 may increase the operation bandwidth of the host interface 740 and reduce the operation bandwidth of the flash interface 760. In contrast, when the value obtained by dividing the latency of the host workload group to be processed through the host interface 740 by the latency of the flash workload group to be processed through the flash interface 760, i.e., the ratio of the latency of the host workload group and the latency of the flash workload group, is equal to or smaller than a second reference value, the interface bandwidth control section 7113 may reduce the operation bandwidth of the host interface 740 and increase the operation bandwidth of the flash interface 760. The first reference value and the second reference value may be the same or different.

The interface bandwidth control section 7113 may dynamically vary the operation bandwidth of the host interface 740 and the operation bandwidth of the flash interface 760, based on the QoS for workloads requested from the host 2000 and monitored by the interface performance monitoring section 7111. For example, when the QoS monitored by the interface performance monitoring section 7111 is equal to a reference value or less, the interface bandwidth control section 7113 may increase the operation bandwidth of the host interface 740 and relatively reduce the operation bandwidth of the flash interface 760.

The interface bandwidth control section 7113 may dynamically vary the operation bandwidth of the host interface 740 and the operation bandwidth of the flash interface 760, based on the performance with which the flash interface 760 processes flash workloads corresponding to commands queued in the command queuing section 730 through the nonvolatile memory device 1100, and which is monitored by the interface performance monitoring section 7111. For example, when the performance with which the flash workloads corresponding to the commands queued in the command queuing section 730 are processed, and which is monitored by the interface performance monitoring section 7111, is a reference value or less, the interface bandwidth control section 7113 may increase the operation bandwidth of the flash interface 760 and relatively reduce the operation bandwidth of the host interface 740.

The interface bandwidth control section 7113 may dynamically vary the operation bandwidth of the host interface 740 and the operation bandwidth of the flash interface 760, based on the memory spaces of the host workload process region 1302 and the flash workload process region 1303 that are allocated by the dynamic buffer allocation section 7112. In other words, when the host workload process region 1302 and the flash workload process region 1303 are allocated by the dynamic buffer allocation section 7112 such that the memory space of the host workload process region 1302 is increased and the memory space of the flash workload process region 1303 is reduced, the interface bandwidth control section 7113 may increase the operation bandwidth of the flash interface 760 and relatively reduce the operation bandwidth of the host interface 740. In contrast, when the host workload process region 1302 and the flash workload process region 1303 are allocated by the dynamic buffer allocation section 7112 such that the memory space of the host workload process region 1302 is reduced and the memory space of the flash workload process region 1303 is increased, the interface bandwidth control section 7113 may reduce the operation bandwidth of the flash interface 760 and relatively increase the operation bandwidth of the host interface 740.

In an embodiment, the dynamic buffer allocation section 7112 may allocate memory spaces to the host workload process region 1302 and the flash workload process region 1303, based on the bandwidth of the host interface 740 and the bandwidth of the flash interface 760 that are varied by the interface bandwidth control section 7113. In other words, when the interface bandwidth control section 7113 increases the bandwidth of the flash interface 760 and relatively reduces the bandwidth of the host interface 740, the dynamic buffer allocation section 7112 may allocate more memory space to the host workload process region 1302 and less memory space to the flash workload process region 1303. In contrast, when the interface bandwidth control section 7113 reduces the bandwidth of the flash interface 760 and relatively increases the bandwidth of the host interface 740, the dynamic buffer allocation section 7112 may allocate less memory space to the host workload process region 1302 and more memory space to the flash workload process region 1303.

The mailbox 712 may be a memory space to be used when the processor 710 exchanges information about program data or read data, i.e., information about whether a logical address or data is valid, with the host interface 740 or the flash interface 760. The mailbox 712 may include an embedded SRAM. The interface performance monitoring section 7111 may monitor, using the data or the logical address exchanged through the mailbox 712, the amount of workloads of the host workload group processed in the host interface 740 or the workload processing performance of the host interface 740, and the amount of workloads of the flash workload group processed in the flash interface 760 or the workload processing performance of the flash interface 760.

Figure 8:
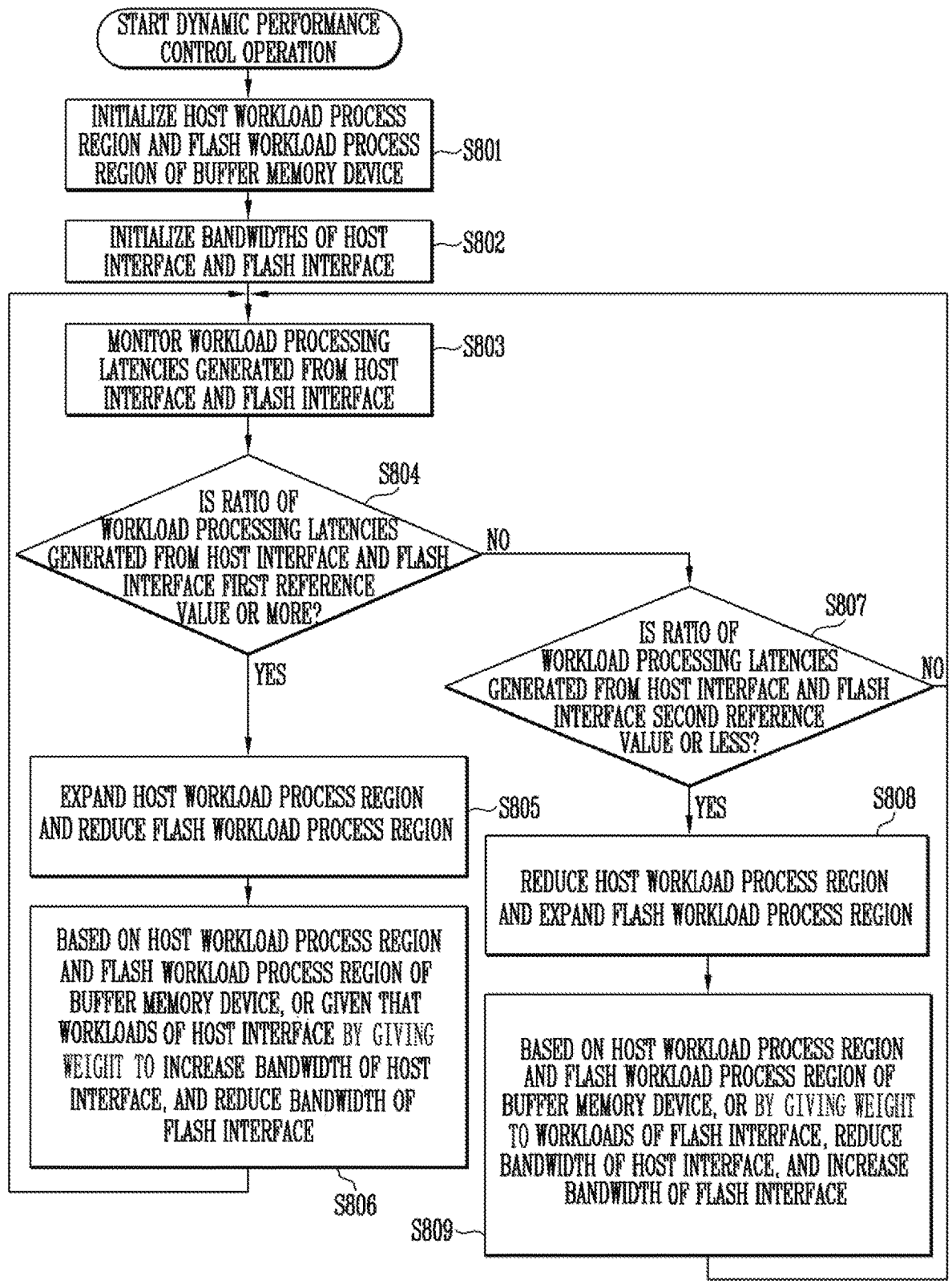
FIG. 8 is a flowchart of a dynamic performance control method, in accordance with an embodiment of the present disclosure.

FIG. 8 is a flowchart of a dynamic performance control method, in accordance with an embodiment of the present disclosure.

Referring to FIG. 8, when the dynamic performance control operation starts in the memory system 1000, the host workload process region 1302 and the flash workload process region 1303 of the buffer memory device 1300 are initialized, at step S801. At step S801, an initial memory space may be allocated to each of the host workload process region 1302 and the flash workload process region 1303. Step S801 may be performed by the dynamic buffer allocation section 7112.

The bandwidth of each of the host interface 740 and the flash interface 760 of the memory system 1000 may be initialized, at step S802. Step S802 may be performed by the interface bandwidth control section 7113. Step S802 may be performed after step S801. Alternatively, step S802 may be performed before step S801. As a further alternative, step S802 and step S801 may be performed simultaneously.

After step S801 and step S802 have been performed, workload processing-related latencies generated from the host interface 740 and the flash interface 760 may be monitored, at step S803. Step S803 may be performed by the interface performance monitoring section 7111. The latencies generated in workload processing of the host interface 740 and the flash interface 760 may be indexes of the workload processing performance of the host interface 740 and the flash interface 760. In other words, the interface performance monitoring section 7111 may predict the performance of the host interface 740 and the performance of the flash interface 760 using the latencies generated in workload processing of the host interface 740 and the flash interface 760. Step S804 may be performed by the interface performance monitoring section 7111.

Here, at step S804, it may be determined whether a ratio of the latencies in workload processing of the host interface 740 and the flash interface 760 is equal to or greater than a first reference value.

If the ratio of the latencies in workload processing of the host interface 740 and the flash interface 760 is the first reference value or more ("YES" at step S804), an operation of allocating the memory space of the buffer memory device 1300 may be performed, i.e., the host workload process region 1302 of the buffer memory device 1300 may be expanded, and the flash workload process region 1303 may be reduced, at step S805. The ratio of the latencies in workload processing of the host interface 740 and the flash interface 760 may be a value obtained by dividing the latency in workload processing of the host interface 740 by the latency in workload processing of the flash interface 760. Step S805 may be performed by the dynamic buffer allocation section 7112.

If the ratio of the workload processing latencies of the host interface 740 and the flash interface 760 is the first reference value or more ("YES" at step S804), the bandwidths of the host interface 740 and the flash interface 760 may be varied. In other words, based on the memory spaces of the host workload process region 1302 and the flash workload process region 1303 of the buffer memory device 1300 that are allocated at step S805, or by giving weight to the workloads of the host interface 740, the bandwidth of the host interface 740 for processing host workload group may be increased, and the bandwidth of the flash interface 760 for processing flash workload group may be relatively reduced, at step S806. Step S806 may be performed by the interface bandwidth control section 7113.

The variation in the bandwidths of the host interface 740 and the flash interface 760 by the interface bandwidth control section 7113 may be performed based on the result of the monitoring of step S804, regardless of the memory spaces of the host workload process region 1302 and the flash workload process region 1303. In other words, step S805, i.e., the operation of allocating the memory space of the buffer memory device 1300, and step S806, i.e., the operation of varying the bandwidths of the host interface 740 and the flash interface 760, may be performed in parallel. In an embodiment, before step S805 is performed, i.e., before the operation of allocating the memory space of the buffer memory device 1300 is performed, the operation of varying the bandwidths of the host interface 740 and the flash interface 760 may be performed, i.e. step 806.

If the ratio of the workload processing latencies of the host interface 740 and the flash interface 760 is less than the first reference value ("NO" at step S804), it is determined whether the ratio of the workload processing latencies of the host interface 740 and the flash interface 760 is equal to or smaller than a second reference value, at step S807. Step S807 may be performed by the interface performance monitoring section 7111.

If the ratio of the workload processing latencies of the host interface 740 and the flash interface 760 is the second reference value or less ("YES" at step S807), the memory space of the buffer memory device 1300 is allocated at step S808. That is, the host workload process region 1302 of the buffer memory device 1300 may be reduced, and the flash workload process region 1303 may be expanded, at step S808. Step S808 may be performed by the dynamic buffer allocation section 7112.

If the ratio of the workload processing latencies of the host interface 740 and the flash interface 760 is the second reference value or less ("YES" at step S807), the bandwidths of the host interface 740 and the flash interface 760 may be varied. In other words, based on the memory spaces of the host workload process region 1302 and the flash workload process region 1303 of the buffer memory device 1300 that are reallocated at step S808, or by giving weight to the workloads of the host interface 740, the bandwidth of the host interface 740 for processing host workload may be reduced, and the bandwidth of the flash interface 760 for processing flash workload may be increased, at step S809. Step S809 may be performed by the interface bandwidth control section 7113.

The variation in the bandwidths of the host interface 740 and the flash interface 760 by the interface bandwidth control section 7113 may be performed based on the result of step S807, regardless of the memory spaces of the host workload process region 1302 and the flash workload process region 1303. In other words, step S808, i.e., the operation of allocating the memory space of the buffer memory device 1300, and step S809, i.e., the operation of varying the bandwidths of the host interface 740 and the flash interface 760, may be performed in parallel. In an embodiment, before the operation of allocating the memory space of the buffer memory device 1300 (i.e., step S808) is performed, the operation of varying the bandwidths of the host interface 740 and the flash interface 760 (i.e., step S809) may be performed.

If the ratio of the workload processing latencies of the host interface 740 and the flash interface 760 is greater than the second reference value ("NO" at step S807), step S803 may be repeated without performing steps S808 and S809.

Figure 9:
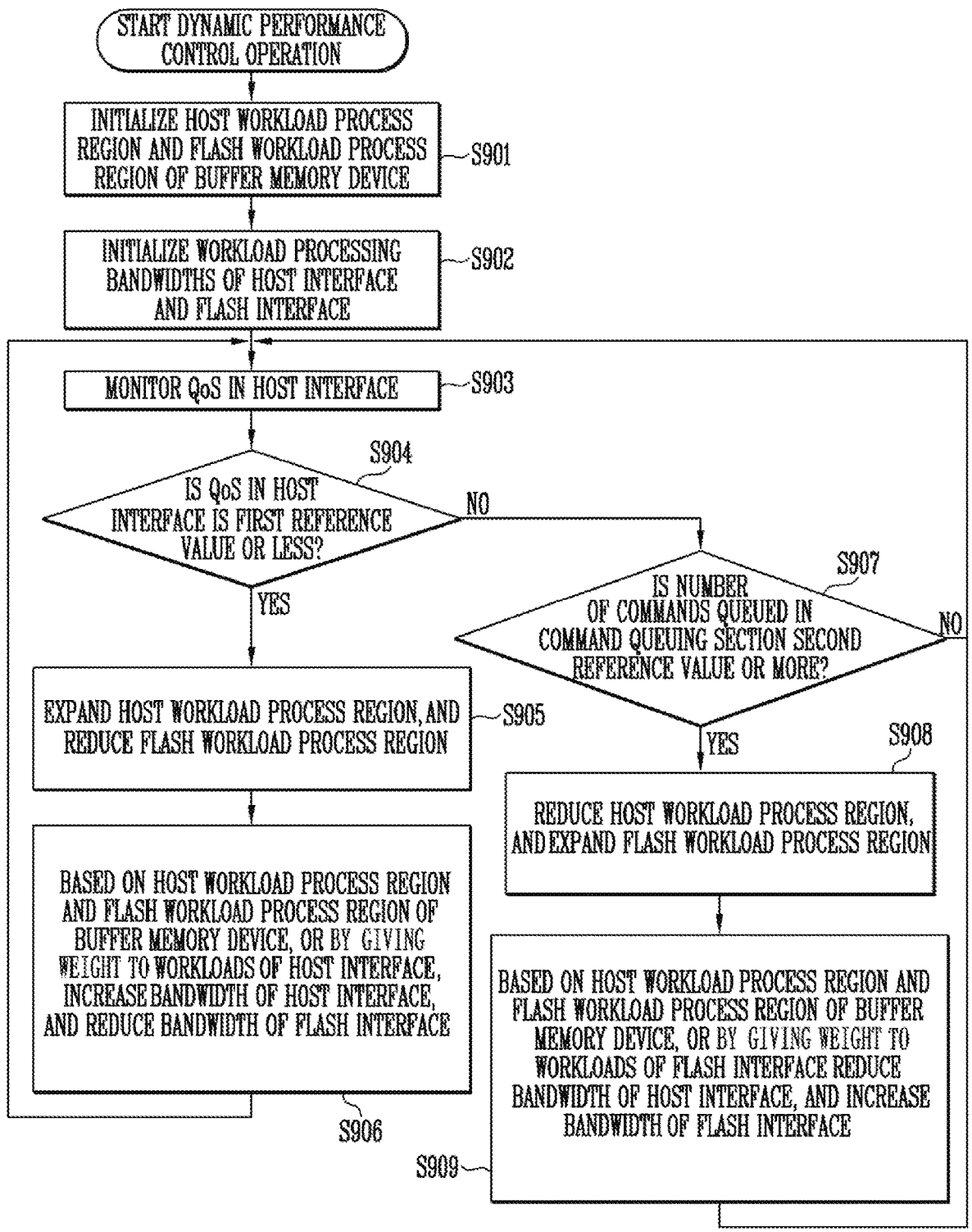
FIG. 9 is a flowchart of a dynamic performance control method, in accordance with an embodiment of the present disclosure.

FIG. 9 is a flowchart of a dynamic performance control method, in accordance with an embodiment of the present disclosure.

Referring to FIG. 9, when the dynamic performance control operation starts in the memory system 1000, the host workload process region 1302 and the flash workload process region 1303 of the buffer memory device 1300 are initialized, at step S901. At step S901, an initial memory space may be allocated to each of the host workload process region 1302 and the flash workload process region 1303. Step S901 may be performed by the dynamic buffer allocation section 7112.

The bandwidth of each of the host interface 740 and the flash interface 760 of the memory system 1000 may be initialized, at step S902. Step S902 may be performed by the interface bandwidth control section 7113. Step S902 may be performed after step S901. Alternatively, step S902 may be performed before step S901. As a further alternative, step S902 and step S901 may be simultaneously performed.

After steps S901 and S902 have been performed, workload processing QoS generated in the host interface 740 may be monitored, at step S903. Step S903 may be performed by the interface performance monitoring section 7111. The QoS in workload processing of the host interface 740 may be an index of the workload processing performance of the host interface 740. In other words, the interface performance monitoring section 7111 may predict the performance of the host interface 740 by monitoring the QoS in workload processing of the host interface 740. Step S904 may be performed by the interface performance monitoring section 7111.

Here, at step S904, it may be determined whether the monitored QoS in the host interface 740 is a first reference value or less.

If the QoS in the host interface 740 is the first reference value or less ("YES" at step S904), an operation of reallocating the memory space of the buffer memory device 1300 may be performed, i.e., the host workload process region 1302 of the buffer memory device 1300 may be expanded, and the flash workload process region 1303 may be reduced, at step S905. Step S905 may be performed by the dynamic buffer allocation section 7112.

If the QoS in the host interface 740 is the first reference value or less ("YES" at step S904), the bandwidths of the host interface 740 and the flash interface 760 may be varied. In other words, based on the memory spaces of the host workload process region 1302 and the flash workload process region 1303 of the buffer memory device 1300 that are allocated at step S905, or by giving weight to the workloads of the host interface 740, the bandwidth of the host interface 740 for processing host workload may be increased, and the bandwidth of the flash interface 760 for processing flash workload may be relatively reduced, at step S906. Step S906 may be performed by the interface bandwidth control section 7113.

The variation in the bandwidths of the host interface 740 and the flash interface 760 by the interface bandwidth control section 7113 may be performed based on the result of step S904, regardless of the memory spaces of the host workload process region 1302 and the flash workload process region 1303. In other words, step S905, i.e., the operation of allocating the memory space of the buffer memory device 1300, and step S906, i.e., the operation of varying the bandwidths of the host interface 740 and the flash interface 760, may be performed in parallel. In an embodiment, before the operation of allocating the memory space of the buffer memory device 1300 (i.e., step S905) is performed, the operation of varying the bandwidths of the host interface 740 and the flash interface 760 (i.e., step S909) may be performed.

If the QoS in the host interface 740 is greater than the first reference value ("NO" at step S904), it may be determined whether the number of commands queued in the command queuing section 730 is a second reference value or more, at step S907. Step S907 may be performed by the interface performance monitoring section 7111.

If the number of commands queued in the command queuing section 730 is equal to the second reference value or more ("YES" at step S907), the memory space of the buffer memory device 1300 is allocated at step S908. That is, the host workload process region 1302 of the buffer memory device 1300 may be reduced, and the flash workload process region 1303 may be expanded, at step S908. Step S908 may be performed by the dynamic buffer allocation section 7112.

If the number of commands queued in the command queuing section 730 is equal to the second reference value or more ("YES" at step S907), the bandwidths of the host interface 740 and the flash interface 760 may be varied. In other words, based on the memory spaces of the host workload process region 1302 and the flash workload process region 1303 of the buffer memory device 1300 that are reallocated at step S908, or by giving weight to the workloads of the host interface 740, the bandwidth for host workload processing of the host interface 740 may be reduced, and the bandwidth of the flash interface 760 for processing flash workload may be increased, and the bandwidth of the flash interface 760 for processing flash workload may be reduced, at step S909. Step S909 may be performed by the interface bandwidth control section 7113.

The variation in the bandwidths of the host interface 740 and the flash interface 760 by the interface bandwidth control section 7113 may be performed based on the result of step S907, regardless of the memory spaces of the host workload process region 1302 and the flash workload process region 1303. In other words, step S908, i.e., the operation of allocating the memory space of the buffer memory device 1300, and step S909, i.e., the operation of varying the bandwidths of the host interface 740 and the flash interface 760, may be performed in parallel. In an embodiment, before step S908, i.e., the operation of allocating the memory space of the buffer memory device 1300, is performed, step S909, i.e., the operation of varying the bandwidths of the host interface 740 and the flash interface 760, may be performed.

If the number of commands queued in the command queuing section 730 is less than the second reference value ("NO" at step S907), step S903 may be performed again without performing steps S908 and S909.

Figure 10:
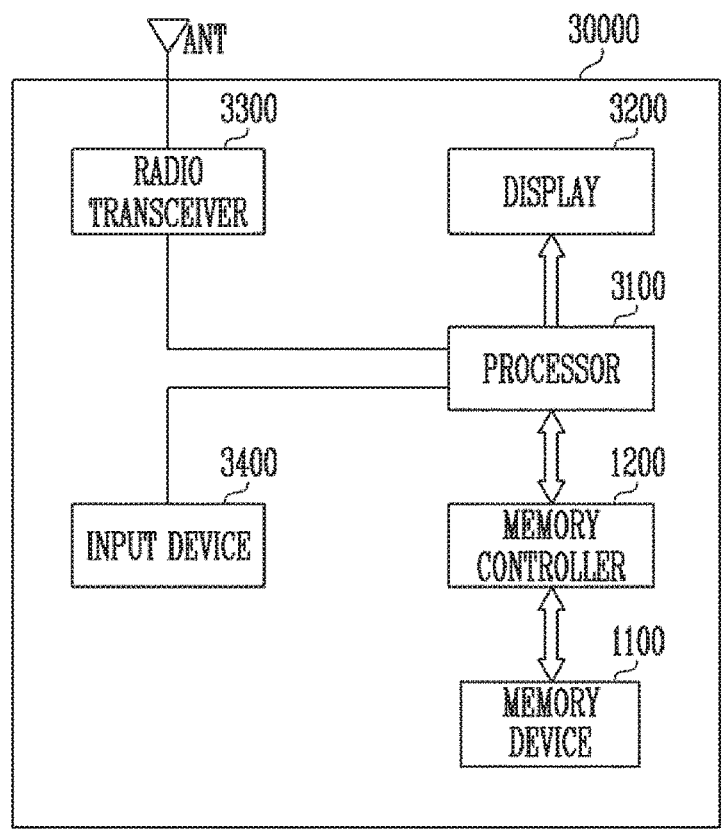
FIG. 10 is a diagram illustrating a memory system including the memory controller shown in FIG. 2, in accordance with an embodiment of the present disclosure.

FIG. 10 is a diagram illustrating an example of a memory system 30000 including the memory controller 1200 shown in FIG. 2.

Referring to FIG. 10, the memory system 30000 may be embodied in a cellular phone, a smartphone, a tablet PC, a personal digital assistant (PDA) or a wireless communication device. The memory system 30000 may include a nonvolatile memory device 1100, and the memory controller 1200 configured to control the operation of the nonvolatile memory device 1100. The memory controller 1200 may control a data access operation, e.g., a program, erase, or read operation, of the nonvolatile memory device 1100 under the control of a processor 3100.

Data programmed to the nonvolatile memory device 1100 may be transferred through a display 3200 under the control of the memory controller 1200.

A radio transceiver 3300 may send and receive radio signals through an antenna ANT. For example, the radio transceiver 3300 may change a radio signal received through the antenna ANT into a signal that may be processed in the processor 3100. Therefore, the processor 3100 may process a signal output from the radio transceiver 3300 and transmit the processed signal to the memory controller 1200 or the display 3200. The memory controller 1200 may program a signal processed by the processor 3100 to the nonvolatile memory device 1100. Furthermore, the radio transceiver 3300 may change a signal output from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be embodied in a pointing device such as a touch pad and a computer mouse, a keypad or a keyboard. The processor 3100 may control the operation of the display 3200 such that data output from the memory controller 1200, data output from the radio transceiver 3300, or data output form the input device 3400 is output through the display 3200.

In an embodiment, the memory controller 1200 capable of controlling the operation of the nonvolatile memory device 1100 may be embodied as a part of the processor 3100 or a chip provided separately from the processor 3100. The memory controller 1200 may be embodied by the example of the memory controller shown in FIG. 8.

Figure 11:
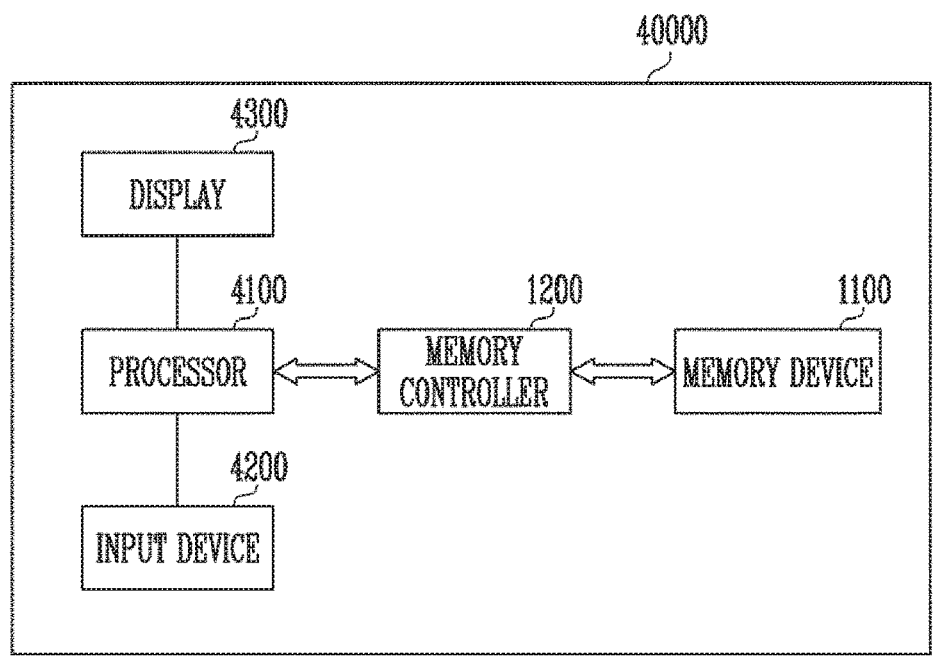
FIG. 11 is a diagram illustrating a memory system including the memory controller shown in FIG. 2, in accordance with an embodiment of the present disclosure.

FIG. 11 is a diagram illustrating an example of a memory system 40000 including the memory controller 1200 shown in FIG. 2.

Referring to FIG. 11, the memory system 40000 may be embodied in a personal computer (PC), a tablet PC, a net-book, an e-reader, a personal digital assistant (PDA), a portable multimedia player (PMP), an MP3 player, or an MP4 player.

The memory system 40000 may include a nonvolatile memory device 1100, and a memory controller 1200 configured to control the data processing operation of the nonvolatile memory device 1100.

A processor 4100 may output data stored in the nonvolatile memory device 1100 through a display 4300, according to data inputted from an input device 4200. For example, the input device 4200 may be embodied in a pointing device such as a touch pad or a computer mouse, a keypad or a keyboard.

The processor 4100 may control the overall operation of the memory system 40000 and control the operation of the memory controller 1200. In an embodiment, the memory controller 1200 capable of controlling the operation of the nonvolatile memory device 1100 may be embodied as a part of the processor 4100 or a chip provided separately from the processor 4100. The memory controller 1200 may be embodied by the example of the memory controller shown in FIG. 8.

Figure 12:
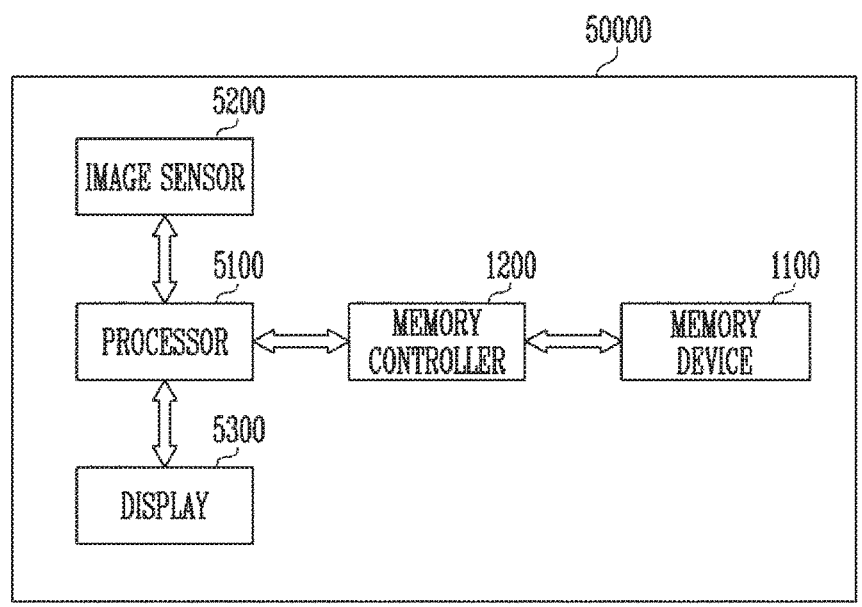
FIG. 12 is a diagram illustrating a memory system including the memory controller shown in FIG. 2, in accordance with an embodiment of the present disclosure.

FIG. 12 is a diagram illustrating an example of a memory system 50000 including the memory controller 1200 shown in FIG. 2.

Referring to FIG. 12, the memory system 50000 may be embodied in an image processing device, e.g., a digital camera, a portable phone provided with a digital camera, a smartphone provided with a digital camera, or a tablet PC provided with a digital camera.

The memory system 50000 may include a nonvolatile memory device 1100, and a memory controller 1200 capable of controlling a data processing operation, e.g., a program, erase, or read operation, of the nonvolatile memory device 1100.

An image sensor 5200 of the memory system 50000 may convert an optical image into digital signals. The converted digital signals may be transmitted to a processor 5100 or the memory controller 1200. Under control of the processor 5100, the converted digital signals may be transferred through a display 5300 or stored in the nonvolatile memory device 1100 through the memory controller 1200. Data stored in the nonvolatile memory device 1100 may be transferred through the display 5300 under control of the processor 5100 or the memory controller 1200.

In an embodiment, the memory controller 1200 capable of controlling the operation of the nonvolatile memory device 1100 may be embodied as a part of the processor 5100 or a chip provided separately from the processor 5100. The memory controller 1200 may be embodied by the example of the memory controller shown in FIG. 8.

Figure 13:
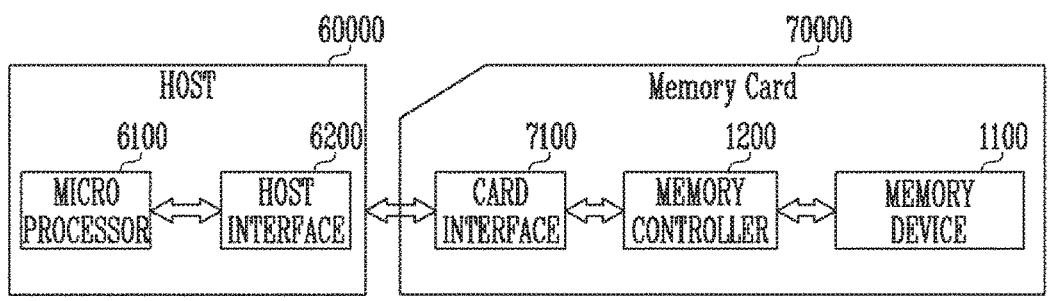
FIG. 13 is a diagram illustrating a memory system including the memory controller shown in FIG. 2, in accordance with an embodiment of the present disclosure.

FIG. 13 is a diagram illustrating an example of a memory system 70000 including the memory controller 1200 shown in FIG. 2.

Referring to FIG. 13, the memory system 70000 may be embodied in a memory card or a smart card. The memory system 70000 may include a nonvolatile memory device 1100, a memory controller 1200, and a card interface 7100.

The memory controller 1200 may control data exchange between the nonvolatile memory device 1100 and the card interface 7100. In an embodiment, the card interface 7100 may be a secure digital (SD) card interface or a multi-media card (MMC) interface, but it is not limited thereto. The memory controller 1200 may be embodied by the example of the memory controller shown in FIG. 8.

The card interface 7100 may interface data exchange between a host 60000 and the memory controller 1200 according to a protocol of the host 60000. In an embodiment, the card interface 7100 may support a universal serial bus (USB) protocol, and an inter-chip (IC)-USB protocol. Here, the card interface may refer to hardware capable of supporting a protocol which is used by the host 60000, software installed in the hardware, or a signal transmission method.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the nonvolatile memory device 1100 through the card interface 7100 and the memory controller 1200 under control of a microprocessor 6100.

According to the present disclosure, in the operation of a memory system, a confined buffer memory space may be dynamically allocated so as to enhance workload processing performance in a host interface and a flash interface, whereby the overall performance of the memory system may be improved.

Examples of embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method of operating a memory system, comprising:
   allocating a first buffer region to a first workload group;
   allocating a second buffer region to a second workload group;
   monitoring a first workload group latency and a second workload group latency;
   dynamically adjusting a memory space of each of the first and second buffer regions based on a result of the monitoring; and
   controlling a bandwidth across a host interface and a bandwidth across a flash interface based on the memory space of the first buffer region and the memory space of the second buffer region,
   wherein a sum of the memory spaces of the first buffer region and the second buffer region is constant,
   wherein the monitoring comprises calculating a ratio of the respective latencies of the first workload group and the second workload group, and
   wherein the dynamically adjusting of the memory space of each of the first and second buffer regions is performed based on the ratio of the respective latencies.

2. The method according to claim 1, wherein the first workload group is processed through the host interface communicating with a host, and the second workload group is processed through the flash interface communicating with a nonvolatile memory device.

3. The method according to claim 1, further comprising expanding the first buffer region and reducing the second buffer region when the ratio is equal to or greater than a reference value.

4. The method according to claim 1, further comprising:
   monitoring a quality of service (QoS) in the host interface; and
   dynamically adjusting the memory spaces of the first buffer region and the second buffer region based on the QoS.

5. The method according to claim 1, further comprising:
   monitoring a number of commands queued in a command queuing section; and
   controlling the respective bandwidths of the host interface and the flash interface based on the number of queued commands.

6. The method according to claim 1, wherein each of the first and second buffer regions comprises a dynamic random-access memory (DRAM).

7. A memory system comprising:
   a host interface configured to communicate with a host and to process host workloads received from the host;
   a flash interface configured to communicate with a nonvolatile memory device and to process flash workloads using the nonvolatile memory device;
   a performance monitoring management section configured to monitor performances with which the host workloads and the flash workloads are processed; and
   a buffer memory including a host workload process region allocated to process the host workloads, and a flash workload process region allocated to process the flash workloads,
   wherein the performance monitoring management section dynamically allocates memory spaces of the host workload process region and the flash workload process region based on a result of the monitoring of the performances, and dynamically controls a bandwidth across the host interface and a bandwidth across the flash interface based on the result of the monitoring of the performances,
   wherein the performance monitoring management section calculates a ratio of respective latencies generated in the host workloads and the flash workloads, and, when the ratio is a reference value or more, the performance monitoring management section expands the memory space of the host workload process region and reduces the memory space of the flash workload process region, and
   wherein a sum of the memory spaces of the host workload process region and the flash workload process region is constant.

8. The memory system according to claim 7, wherein the performance monitoring management section is configured to monitor the respective latencies generated for the host workloads and the flash workloads.

9. The memory system according to claim 7, wherein the buffer memory comprises a dynamic random-access memory (DRAM).

10. The memory system according to claim 7, wherein the buffer memory comprises an embedded static random-access memory (embedded SRAM).

11. The memory system according to claim 7, wherein the performance monitoring management section is configured to monitor a quality of service (QoS) in the host interface.

12. The memory system according to claim 7, further comprising a command queuing section configured to queue commands corresponding to the flash workloads.

13. The memory system according to claim 7, wherein the buffer memory further includes a physical-logical address mapping information storing region configured to store physical-logical address mapping information.

14. A method of operating a memory system, comprising:
   setting a first bandwidth for first workload processing through a host interface;

setting a second bandwidth for second workload processing through a flash interface;
monitoring a quality of service (QoS) of the first workload processing through the host interface;
dynamically varying the first bandwidth and the second bandwidth based on a result of the monitoring;
allocating a first buffer region for the first workload processing, and allocating a second buffer region for the second workload processing; and
varying memory spaces of the first and second buffer regions based on the first bandwidth or the second bandwidth,
wherein a sum of the memory spaces of the first buffer region and the second buffer region is constant,
wherein the monitoring comprises calculating a ratio of respective latencies of a first workload group corresponding to the first buffer region and a second workload group corresponding to the second buffer region, and
wherein the varying of the memory space of each of the first and second buffer regions is performed based on the ratio of the respective latencies.

\* \* \* \* \*